United States Patent
Hong et al.

(10) Patent No.: US 11,824,154 B2
(45) Date of Patent: Nov. 21, 2023

(54) STACK TYPE ELECTRODE ASSEMBLY IN WHICH BENDING PHENOMENON IS ALLEVIATED, AND MANUFACTURING METHOD THEREFOR

(71) Applicant: LG CHEM, LTD., Seoul (KR)

(72) Inventors: Suk Hyun Hong, Daejeon (KR); Eui Kyung Lee, Daejeon (KR); Hyo Jin Park, Daejeon (KR); Joon Sung Bae, Daejeon (KR); Beom Koon Lee, Daejeon (KR); Dong Hun Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 685 days.

(21) Appl. No.: 16/975,655

(22) PCT Filed: Dec. 19, 2019

(86) PCT No.: PCT/KR2019/018098
§ 371 (c)(1),
(2) Date: Aug. 25, 2020

(87) PCT Pub. No.: WO2020/138841
PCT Pub. Date: Jul. 2, 2020

(65) Prior Publication Data
US 2020/0411896 A1    Dec. 31, 2020

(30) Foreign Application Priority Data

Dec. 24, 2018 (KR) ........................ 10-2018-0168229

(51) Int. Cl.
*H01M 10/04* (2006.01)
*H01M 50/46* (2021.01)
(Continued)

(52) U.S. Cl.
CPC ....... *H01M 10/0431* (2013.01); *H01M 4/043* (2013.01); *H01M 4/0471* (2013.01);
(Continued)

(58) Field of Classification Search
None
See application file for complete search history.

(56) References Cited

U.S. PATENT DOCUMENTS

2003/0013012 A1    1/2003    Ahn et al.
2014/0212729 A1    7/2014    Park et al.
(Continued)

FOREIGN PATENT DOCUMENTS

CN    103959541 A    7/2014
CN    104054205 A    9/2014
(Continued)

OTHER PUBLICATIONS

Machine translation of JP 2014-120456 A (Year: 2014).*
(Continued)

*Primary Examiner* — Robert S Carrico
(74) *Attorney, Agent, or Firm* — Birch, Stewart, Kolasch & Birch, LLP (57) ABSTRACT

An electrode includes a unit body stack part formed by stacking at least one basic unit having a four-layer structure in which a first electrode, a first separator, a second electrode and a second separator are sequentially stacked. Each surface of the first separator and the second separator is coated with a coating material having adhesiveness, and the basic unit adheres to an adjacent radial unit in the unit body stack part. The electrode assembly of allows a heating and pressing process to be performed prior to a primary formation process so that a separator of one basic unit and a first electrode of the other basic unit to be adhered and fixed by a coating material coated on the separator, and thus a (Continued)

bending phenomenon caused by a difference in electrode expansion rates in a charging/discharging process is prevented.

14 Claims, 5 Drawing Sheets

(51) Int. Cl.
H01M 10/0569 (2010.01)
H01M 4/04 (2006.01)
H01M 10/0585 (2010.01)
H01M 10/052 (2010.01)
H01M 50/443 (2021.01)

(52) U.S. Cl.
CPC ..... *H01M 10/052* (2013.01); *H01M 10/0569* (2013.01); *H01M 10/0585* (2013.01); *H01M 50/461* (2021.01); *H01M 50/443* (2021.01); *H01M 2300/0028* (2013.01)

(56) References Cited

U.S. PATENT DOCUMENTS

| | | | |
|---|---|---|---|
| 2014/0363725 A1 | 12/2014 | Park et al. | |
| 2014/0377631 A1* | 12/2014 | Park | H01M 50/457 429/152 |
| 2015/0033547 A1 | 2/2015 | Yang et al. | |
| 2016/0036087 A1 | 2/2016 | Na et al. | |
| 2017/0222280 A1 | 8/2017 | Asano et al. | |

FOREIGN PATENT DOCUMENTS

| | | |
|---|---|---|
| CN | 104221201 A | 12/2014 |
| CN | 104604015 A | 5/2015 |
| CN | 104718655 A | 6/2015 |
| CN | 108335915 A | 7/2018 |
| JP | 2008-546135 A | 12/2008 |
| JP | 2014120456 A * | 6/2014 |
| KR | 10-2001-0082058 A | 8/2001 |
| KR | 10-2013-0131736 A | 12/2013 |
| KR | 10-2014-0079712 A | 6/2014 |
| KR | 10-2014-0103084 A | 8/2014 |
| KR | 10-2014-0117789 A | 10/2014 |
| KR | 10-2015-0033887 A | 4/2015 |
| KR | 10-2015-0034944 A | 4/2015 |
| KR | 10-2015-0059576 A | 6/2015 |
| KR | 10-2016-0036799 A | 4/2016 |
| KR | 10-2017-0051291 A | 5/2017 |
| WO | WO2016/051639 A1 | 4/2016 |

OTHER PUBLICATIONS

Japanese Office Action for Japanese Application No. 2020-543159 dated, Oct. 25, 2022, with English Translation.
International Search Report for PCT/KR2019/018098 dated Apr. 3, 2020.
Extended European Search Report for European Application No. 19905046.9, dated Jun. 17, 2021.
Chinese Office Action and Search Report for Chinese Application No. 201980017356.7, dated Aug. 19, 2023, with a brief English translation of the Chinese Office Action.

* cited by examiner

STACK TYPE ELECTRODE ASSEMBLY IN WHICH BENDING PHENOMENON IS ALLEVIATED, AND MANUFACTURING METHOD THEREFOR

TECHNICAL FIELD

This application claims the benefit of priority based on Korean Patent Application No. 10-2018-0168229, filed on Dec. 24, 2018, and the entire contents of the Korean patent application are incorporated herein by reference.

The present invention relates to a lamination stack type electrode assembly and a method for manufacturing the same, and particularly, to a lamination stack-type electrode assembly capable of improving a bending phenomenon of an electrode assembly that can be caused by an activation process, and a method of manufacturing the same.

BACKGROUND ART

A secondary battery may be variously classified according to the structure of the electrode assembly. For example, the secondary battery may be classified into a stacked structure, a wound type (jelly roll type) structure, and a stack/folding type structure. However, in the stacked structure, since electrode units (positive electrodes, separators, and negative electrodes) constituting the electrode assembly are stacked separately from each other, it is very difficult to precisely align the electrode assembly, and a lot of processes are required to produce electrode assemblies. In addition, since the stack/folding type structure generally requires two lamination equipments and one folding equipment, the manufacturing process of the electrode assembly is very complicated. In particular, the stack/folding type structure has a disadvantage that it is difficult to precisely align the full cell or the bicell because the full cell or the bicell is stacked through folding.

Accordingly, an electrode assembly having a lamination-and-stack structure appeared. The lamination and stack type structure can be manufactured by laminating basic unit bodies formed by alternately stacking electrodes and separators to impart adhesive force between the electrode and the separator in the basic unit body, and simply stacking the basic units repeatedly.

On the other hand, the secondary battery is manufactured through an assembly process in which the electrode assembly is accommodated in a battery case to inject and seal the electrolyte, a pre-aging process in which the electrolyte is made to be well wetted to an electrode and a separator, and an activation process in which the battery structure is stabilized and is made to be usable. In the activation process, a secondary battery is mounted on a predetermined jig for smooth current flow, and charging and discharging are performed under conditions necessary for activation. This is also called a jig formation. Due to the characteristics of the secondary battery, in order to activate the positive electrode active material during the first cycle and to generate a stable surface film (SEI, Solid Electrolyte Interface) at the negative electrode, this activation process should be performed first. In addition, during the jig formation, in order to prevent the formation of a non-uniform SEI film due to gas generated by the initial charging, pressurization may be performed simultaneously with charging.

In the activation process as described above, when the secondary battery is charged and discharged, the positive electrode and the negative electrode expand in volume. During the activation process of the secondary battery to which the electrode assembly of the lamination and stack type structure is applied, the secondary battery is bent toward the full length of the secondary battery.

Figure 4:
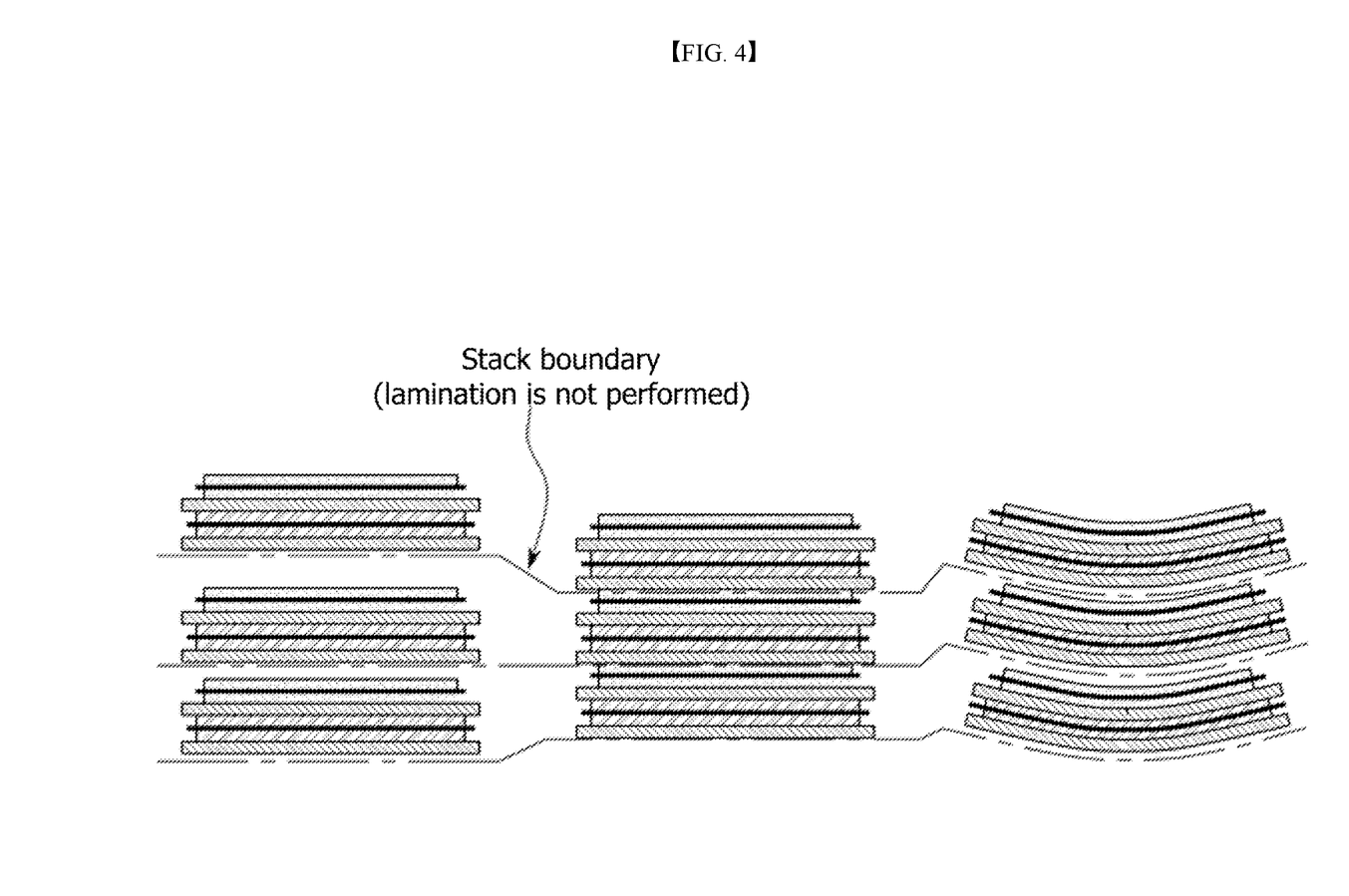
FIG. 4 is a schematic diagram of a principle in which a bending phenomenon occurs in a conventional electrode assembly.

FIG. 4 illustrates a mechanism in which a bending phenomenon occurs during an activation process of a lamination and stack type electrode assembly. Referring to this, the electrode assembly of the conventional lamination and stack type structure is formed by simple lamination of the basic unit, so that an adhesive force is not formed between the basic unit and the adjacent basic unit. On the other hand, an adhesive force is formed between the electrode and the separator in the basic unit. This is because, during the manufacture of the basic unit, a lamination process is performed, and the binder is melted by the lamination process to form an adhesive force between the separator and the electrode.

When the electrode assembly of the lamination and stack type structure is charged, the positive electrode and the negative electrode expand. Since the volume expansion coefficients of the positive electrode and the negative electrode are different, a bending phenomenon occurs in which the basic unit is entirely bent as stress is accumulated inside the basic unit.

Figure 5:
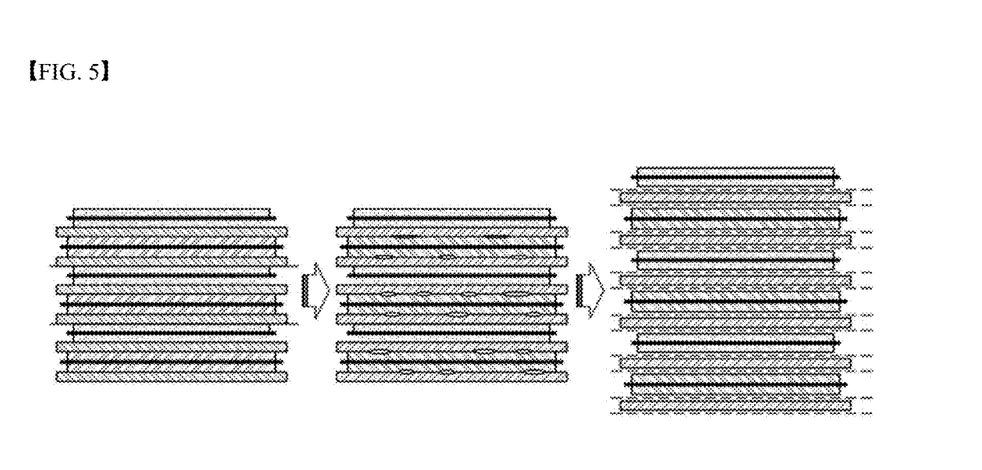
FIG. 5 is a schematic view showing the reason why a bending phenomenon does not occur when a general activation process is performed on a lamination stack-type electrode assembly instead of a jig formation.

On the other hand, even in the case of an electrode assembly of a lamination and stack type structure, if it is not pressed at the same time as the initial charging, the interface adhesive force is weakened by the activation gas at all interfaces between the first electrode and the first separator, between the first separator and the second electrode, between the second electrode and the second separator, and between the basic unit bodies. As such, even if the positive electrode and the negative electrode are expanded, stress is distributed inside the basic unit body, and individual electrodes expand in the vertical direction, so the above bending does not occur (see FIG. 5).

Figure 6:
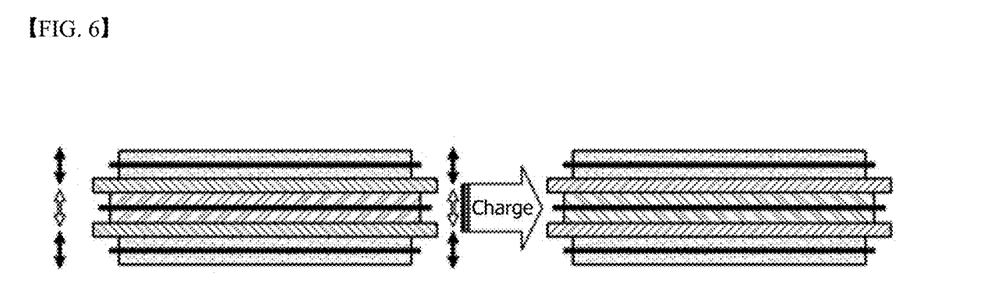
FIG. 6 is a schematic view showing a reason why a bending phenomenon does not occur in an electrode assembly different from the lamination stack type structure of the present invention.

In addition, even in the electrode assembly of the lamination and stack type structure, as shown in FIG. 6, the electrode assembly of the stack-type structure, in which the basic unit bodies of the first electrode/first separator/second electrode/second separator/first electrode/first separator are repeatedly stacked, has a bidirectional symmetrical structure based on the second electrode. As such, even if the volume of the electrode expands, the positive electrode and the negative electrode have the same expansion direction, so the bending phenomenon hardly occurs. However, the lamination-and-stack-type electrode assembly, in which the basic unit bodies of the first electrode/first separator/second electrode/second separator are repeatedly stacked, has an asymmetric expansion direction, and thus, as described above, structural deformation such as bending occurs during charging and discharging of the activation process.

Therefore, in the case of applying a jig formation process of simultaneously performing charging and pressurization to the electrode assembly of the lamination and stack type structure, there is a need to develop a technology for an electrode assembly capable of preventing a bending phenomenon, and a manufacturing method thereof.

DISCLOSURE

Technical Problem

An object of the present invention is to improve a phenomenon that the electrode assembly is bent by an activation process in a lamination stack type electrode assembly.

Another object of the present invention is to improve the productivity of the battery by improving the bending phenomenon of the electrode assembly.

Technical Solution

An electrode assembly of the present invention includes a unit body stack portion which is generated by stacking at least two basic unit bodies, each basic unit body has a four-layer structure in which a first electrode, a first separator, a second electrode, and a second separator are sequentially stacked, wherein coating materials having adhesive force are applied to respective surfaces of the first and second separator, and wherein one basic unit body of the at least two basic unit bodies is adhered to an adjacent basic unit body of the at least two basic unit bodies in the unit stack portion.

In the electrode assembly according to according to an embodiment of the present invention, adhesive force between the one basic unit body and the adjacent basic unit body may be equal to or greater than adhesive force between the first electrode and the first separator in each basic unit body.

In the electrode assembly according to an embodiment of the present invention, the second separator may be coated with the coating material on one side facing the second electrode and on an opposite side thereof, and the at least two basic unit bodies may be adhered to each other by the coating material of the second separator.

In the electrode assembly according to an embodiment of the present invention, the coating material may be formed of a mixture of inorganic particles and a binder polymer that connects and fixes the inorganic particles to each other. At this time, the inorganic particles may form a densely packed structure to form interstitial volumes between the inorganic particles in the coating layer as a whole, and a pore structure may be formed in the coating layer by interstitial volumes defined by the inorganic particles.

In the electrode assembly according to an embodiment of the present invention, a difference between a thickness of the electrode assembly measured for 2 seconds under a pressure of 30 kgf and a thickness of the electrode assembly measured for 2 seconds under a pressure of 90 kgf may be 100 µm or less.

In the electrode assembly according to an embodiment of the present invention, the first electrode may be a positive electrode, and the second electrode may be a negative electrode.

In the electrode assembly according to an embodiment of the present invention, each basic unit body may be formed by repeatedly stacking the four-layer structure.

Further, the present invention provides a method of manufacturing a secondary battery including the electrode assembly described above, and the method includes steps of: preparing each basic unit body having the four-layer structure in which the first electrode, the first separator, the second electrode and the second separator are sequentially stacked (S100); preparing the unit body stack portion by repeatedly stacking the basic unit bodies (S200); accommodating the electrode assembly including the unit body stack portion in a battery case, then injecting electrolyte and sealing the battery case (S300); and making the second separator of the one basic unit body be adhered to the first electrode of the adjacent basic unit body in the unit body stack portion by applying heat and pressure (S400).

In the method of manufacturing the secondary battery according to an embodiment of the present invention, the coating material having the adhesive force may include a binder, and a temperature of the applies heat of step S400 may be a temperature at which the adhesive force of the binder is maximized.

In an embodiment of the present invention, the temperature of the applied heat of step S400 may be 45° C. to 85° C. or the temperature of the applied heat of step S400 may be 45° C. to 70° C.

In the manufacturing method according to an embodiment of the present invention, a pressure of the applied pressure of step S400 may be 1 to 10 kgf/cm$^2$, and heating and pressurizing time may be 2 to 20 minutes.

In the manufacturing method according to an embodiment of the present invention, after the step S400, a primary formation process may be further performed. At this time, a temperature during the primary formation process may be 45° C. or less.

In the manufacturing method according to an embodiment of the present invention, a solvent of the electrolyte may be ethyl methyl carbonate or dimethyl carbonate.

The present invention provides a secondary battery including the electrode assembly as described above, and such a secondary battery has the advantage of improving the productivity by preventing the bending phenomenon.

Advantageous Effects

According to an electrode assembly of the present invention, it is possible to prevent the bending phenomenon of the electrode assembly that may occur during the charging and discharging process as the separator of one basic unit body and the first electrode of the other basic unit body are adhered and fixed by the coating material coated on the separator by performing a lamination process to heat-press the electrode assembly before the first formation process.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

Hereinafter, preferred embodiments of the present invention will be described in detail with reference to the accompanying drawings.

An electrode assembly according to an embodiment of the present invention includes a unit body stack portion in which one or more basic unit bodies, which form a four-layer structure by sequentially stacking a first electrode, a first separator, a second electrode, and a second separator, are stacked, and coating materials having adhesive strength are applied to the surfaces of the first and second separators are applied to the electrode assembly, and the basic unit body is adhered to an adjacent basic unit body.

The electrode assembly according to an embodiment of the present invention is not simply a plurality of basic unit bodies stacked repeatedly. By performing a lamination process of heating and pressing the electrode assembly, which is generated by stacking a plurality of basic unit bodies, at a temperature condition in which the adhesive force of the coating material coated on the separator is maximized, the separator of one basic unit body and the first electrode of the adjacent basic unit body are bonded to each other, so that respective interfaces of the basic unit body and the adjacent basic unit is bonded.

Figure 1:
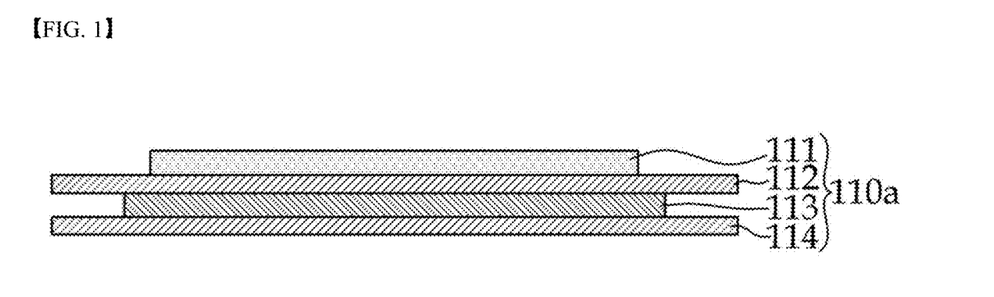
FIG. 1 is a side view showing the structure of a basic unit according to an embodiment of the present invention.

In the electrode assembly according to the present invention, the basic unit is formed by alternately stacking electrodes and separators. At this time, the same number of electrodes and separators are stacked. For example, as illustrated in FIG. 1, the basic unit 110a may be formed by stacking two electrodes 111 and 113 and two separators 112 and 114. At this time, the positive electrode and the negative electrode can naturally face each other through a separator. When the basic unit is formed in this way, an electrode (see the electrode of reference numeral 111 in FIGS. 1 and 2) is located at one end of the basic unit, and a separator (see the separator of reference numeral 114 in FIGS. 1 and 2) is located at the other end of the basic unit.

The present invention has a basic feature in that it is possible to form a unit stack portion by repeatedly stacking one type of basic unit or by stacking two or more type of basic units in a predetermined order. In order to implement this feature, the basic unit may have the following structure.

First, the basic unit body may be formed by sequentially stacking a first electrode, a first separator, a second electrode, and a second separator. More specifically, as illustrated in FIG. 1, basic unit bodies 110a are formed by sequentially stacking a first electrode 111, a first separator 112, a second electrode 113, and a second separator 114 from top to bottom or from bottom to top. At this time, the first electrode 111 and the second electrode 113 are opposite electrodes. For example, if the first electrode 111 is a positive electrode, the second electrode 113 is a negative electrode.

Figure 2:
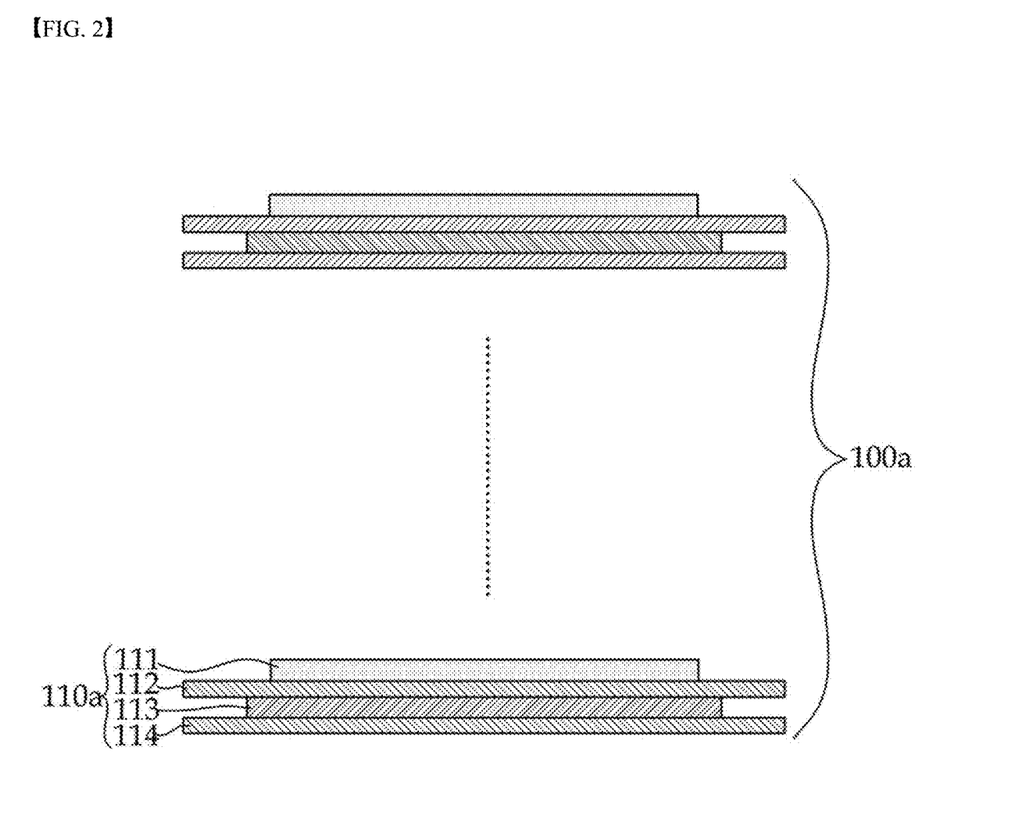
FIG. 2 is a side view showing the structure of a unit stack portion according to an embodiment of the present invention.

As described above, when the first electrode, the first separator, the second electrode, and the second separator are sequentially stacked to form a basic unit, the basic unit 110a may be repeatedly stacked to form a unit stack portion 100a, as illustrated in FIG. 2 through a manufacturing step (second step) of a unit stack portion, which will be described later.

Figure 3:
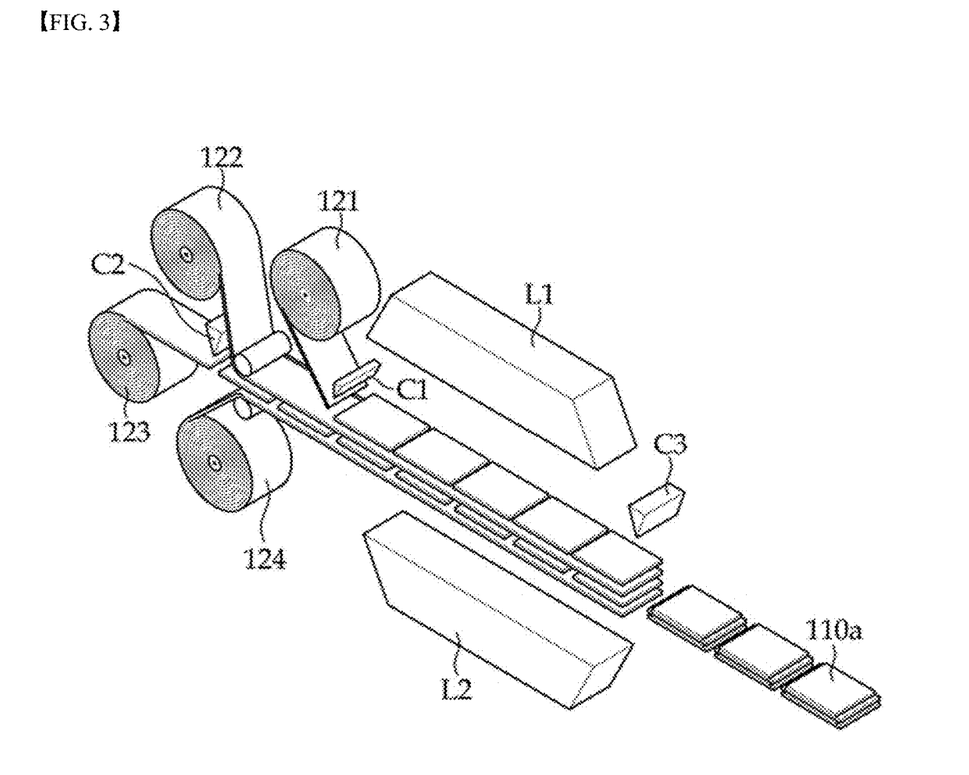
FIG. 3 is a process diagram showing a process for manufacturing another basic unit according to the present invention.

Referring to FIG. 3, the process for manufacturing the basic unit of the present invention will be described. First, a first electrode material 121, a first separator material 122, a second electrode material 123, and a second separator material 124 are prepared. Here, the first separator material 122 and the second separator material 124 may be the same material. Then, the first electrode material 121 is cut into a predetermined size through the cutter C1, and the second electrode material 123 is also cut into a predetermined size through the cutter C2. Then, the first electrode material 121 is stacked on the first separator material 122, and the second electrode material 123 is stacked on the second separator material 124.

Then, it is preferable to bond the electrode material and the separator material to each other in the laminators L1 and L2. The basic unit body, in which the electrode and the separator are integrally combined, may be manufactured through such adhesion. The methods of binding can vary. The laminators L1 and L2 apply pressure or heat to the material for adhesion. Such adhesion makes it easier to stack the basic unit bodies when manufacturing the unit body stack unit. In addition, such adhesion is advantageous for the alignment of the basic unit bodies. When the first separator material 122 and the second separator material 124 are cut to a predetermined size through the cutter C3 after such bonding, the basic unit body 110a may be manufactured. During this process, the end of the separator is not joined to the end of the adjacent separator.

In this way, the electrode in the basic unit body may be adhered to an adjacent separator. Alternatively, the separator may be adhered to the electrode. At this time, the electrode is preferably adhered to the separator as a whole from the side facing the separator. This is because the electrode can be stably fixed to the separator. Typically, the electrode is smaller than the separator.

For this purpose, an adhesive can be applied to the separator. However, in order to use the adhesive as described above, it is necessary to apply the adhesive in the form of meshes or dots over the adhesive surface. This is because if the adhesive is applied to the entire adhesive surface without fail, reactive ions such as lithium ions cannot pass through the separator. Therefore, if an adhesive is used, it is difficult to adhere the electrode completely, even if it is possible to allow the electrode to be adhered to the separator as a whole (i.e., over the entire adhesive surface).

Alternatively, the electrode may be entirely adhered to the separator through a separator having a coating layer having adhesive force. The separator may include a porous separator substrate such as a polyolefin-based separator substrate, and a porous coating layer coated on one or both sides of the separator substrate. At this time, the coating layer may be formed of a mixture of inorganic particles and a binder polymer that connects and fixes the inorganic particles to each other.

Here, the inorganic particles can improve the thermal stability of the separator. That is, the inorganic particles can prevent the separator from shrinking at high temperatures. In addition, the binder polymer may improve the mechanical stability of the separator by fixing the inorganic particles. In addition, the binder polymer can bond the electrode to the separator. Since the binder polymer is distributed throughout the coating layer, unlike the above-described adhesive, adhesion can occur on the entire adhesive surface. Therefore, when such a separator is used, the electrode can be more stably fixed to the separator. The above-described laminator can be used to enhance the adhesion.

However, the inorganic particles may form a densely packed structure to form interstitial volumes between the inorganic particles as a whole in the coating layer. At this time, the pore structure may be formed in the coating layer by the interstitial volume defined by the inorganic particles. Due to this pore structure, even if a coating layer is formed on the separator, lithium ions can pass through the separator well. For reference, the interstitial volume defined by the inorganic particles may be blocked by the binder polymer depending on the location.

Here, the filling structure may be described as a structure in which gravel is contained in a glass bottle. Therefore, when the inorganic particles form a filling structure, the interstitial volume between the inorganic particles is not formed locally in the coating layer, but the interstitial volume between the inorganic particles is entirely formed in the coating layer. Accordingly, when the size of the inorganic particles increases, the size of the pores by the interstitial volume also increases. Due to this charging structure, lithium ions can smoothly pass through the separator on the entire surface of the separator.

The unit body stack portion of the present invention is formed by repeatedly stacking the basic unit bodies, and the interface between a basic unit body and an adjacent basic unit body is bonded.

As described above, in the conventional lamination and stack type electrode assembly, an adhesive force is formed between the electrode and the separator in the basic unit body, but since the unit body stack portion is formed by simple lamination of the basic unit bodies, the adhesive force is not formed between the basic unit bodies. When a formation process including pressurization and charging is performed on the electrode assembly having the same structure, the first electrode and the second electrode are expanded. At this time, since the volume expansion coefficients of the first electrode and the second electrode are different, as the stress accumulates inside the basic unit body, a bending phenomenon occurs in which the basic unit is bent as a whole.

According to the present invention, by heating and pressing the electrode assembly before the formation process, the adhesive force of the coating material applied to the surface of the separator is maximized, and a basic unit is attached to another basic unit. As such, even if the positive electrode and the negative electrode expand by the subsequent formation process, since the positive electrode and the negative electrode are continuous, the stress caused by the volume expansion of the electrode is relieved, and the directionality of expansion is offset, so that the bending phenomenon of the electrode assembly does not occur.

As described above, the coating material is formed of a mixture of inorganic particles and a binder polymer that connects and fixes the inorganic particles to each other, and the coating material may be applied to the first separator and the second separator, respectively. In one embodiment of the present invention, in the first separator, the coating material is coated on both sides facing the first electrode and the second electrode, and in the second separator, the coating material is coated on one surface facing the second electrode and its opposite surface.

The binder polymer contained in the coating material exhibits adhesive force by heating. Since the temperature at which the adhesive force is maximized for each type of binder polymer is different, the optimum temperature during the heating and pressing process of the electrode assembly of the present invention is preferably the temperature at which the adhesive force of the binder polymer is maximized.

The electrode assembly of the present invention is characterized in that the coating material gives adhesive force to the interface between the basic unit bodies, and in the unit body stack portion, the adhesive force between a basic unit body and an adjacent basic unit body is equal to or greater than the adhesive force between the first electrode and the first separator in the basic unit body.

This is because, in the interface (referred to as "lamination surface") between the first separator and the first electrode in the basic unit body, the electrolyte is not impregnated well by being adhered by the coating material already applied to the separator in the process of manufacturing the basic unit body, while, since the adhesion between a basic unit body and a basic unit body was not achieved before the heating and pressing process (lamination process) of the present invention, the electrolyte is well impregnated between a basic unit and a basic unit, and thus adhesive force is well formed by the subsequent heating and pressing process. Hence, in the electrode assembly of the present invention, in the unit body stack portion, the adhesion between the basic unit bodies and between the adjacent basic unit bodies becomes equal to or greater than the adhesion between the first electrode and the first separator in the basic unit body.

Figure 7:
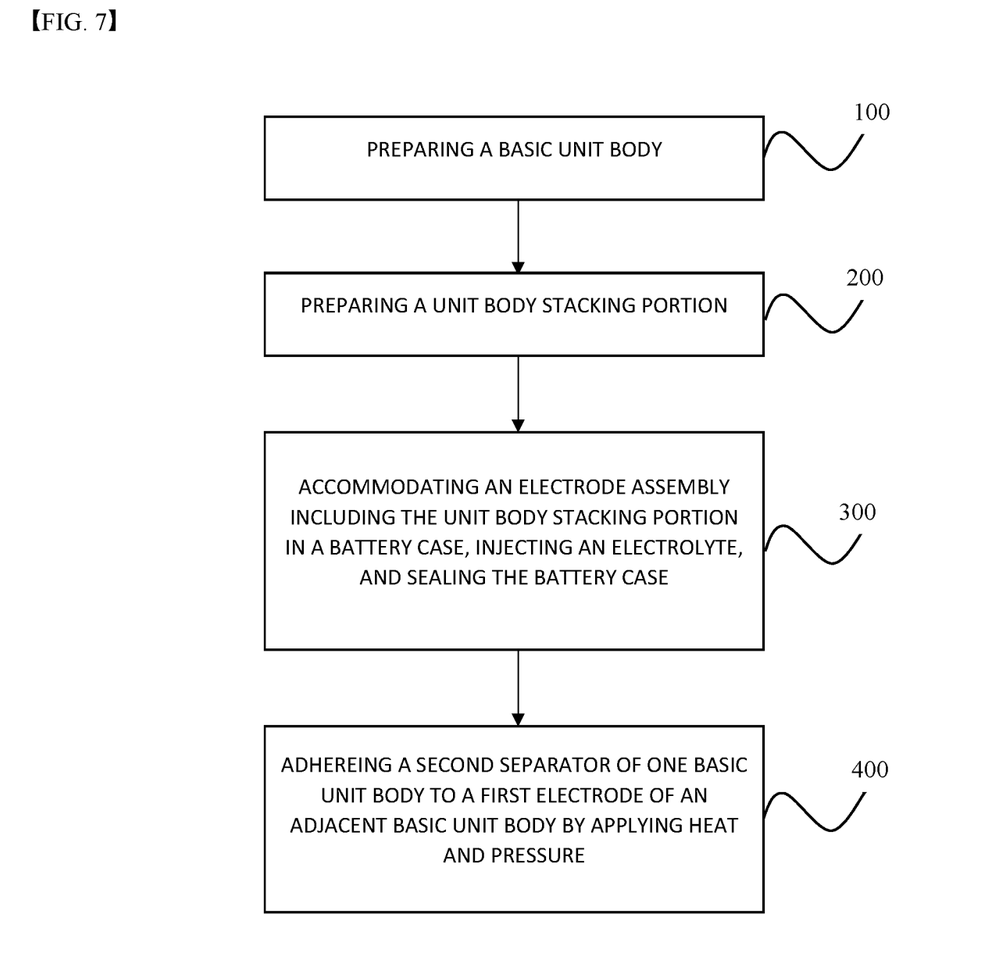
FIG. 7 is a flow chart showing a method for manufacturing a secondary battery including an electrode assembly according to an embodiment of the present invention.

Hereinafter, referring to FIG. 7, a method of manufacturing a secondary battery including the electrode assembly of the present invention will be described.

The method of manufacturing a secondary battery of the present invention includes steps of: preparing a basic unit body which forms a 4 layer structure in which a first electrode, a first separator, a second electrode and a second separator are sequentially stacked (S100); preparing a unit body stack portion by repeatedly stacking the basic unit body (S200); accommodating the electrode assembly including the unit body stack portion in a battery case, then injecting electrolyte and sealing the battery case (S300); and making a second separator of the one basic unit body be adhered to a first electrode of its adjacent basic unit body in the unit body stack portion by applying heat and pressure (S400).

Since the basic unit body manufacturing step (S100) and the unit body stack portion manufacturing step (S200) have been described above, the process after the stack portion manufacturing step will be described in detail.

The assembling step (S300) includes inserting the above prepared electrolyte assembly into the battery case and then injecting electrode. In some cases, a step of storing, at room temperature and atmospheric pressure for a predetermined period of time (pre-aging), a secondary battery assembled to allow the electrode to be well impregnated in the first electrode, the first separator, the second electrode, and the second separator.

The lamination step (S400) is a step of applying an adhesive force between the basic unit body constituting the unit body stack portion and the adjacent basic unit, in which the adhesive force of the binder contained in the coating material applied to the first separator is formed by heating and pressing to thereby allow basic unit bodies to be bonded to each other.

Therefore, it is preferable to adjust the temperature of the lamination step by appropriately selecting and adjusting the temperature at which the adhesive strength of the binder is maximized in consideration of the physical properties of the binder. Specifically, the temperature of the lamination step may be 45° C. to 85° C., but is not limited thereto. In one embodiment of the present invention, the temperature of the lamination step was preferably 45° C. to 70° C.

If the lamination temperature is too low, it is difficult to achieve the object of the present invention because the adhesion between a basic unit body and an adjacent basic unit body is insufficient, and if it is too high, the adhesion of the binder decreases rapidly and the coating material layer containing the binder may be peeled off from the separator.

The pressure of the lamination step (S400) may be selected within an appropriate numerical range in consideration of the thickness of the electrode assembly, the electrode, and the physical properties of the binder coated on the separator. Specifically, it may be 1 to 10 kgf/cm$^2$, preferably 2 to 6 kgf/cm$^2$, and more preferably 3 to 5 kgf/cm$^2$. When the pressure is less than 1 kgf/cm$^2$, it may be difficult to achieve the object of the present invention due to insufficient pressure and insufficient adhesion between a basic unit body and a basic unit body, and when the pressure exceeds 10 kgf/cm$^2$, the pressure is too strong to damage the electrode assembly, which is undesirable.

The pressing time of the lamination step (S400) may be 2 to 20 minutes, and more preferably 5 to 15 minutes. The pressing time may be appropriately selected within the above range in consideration of the thickness of the electrode assembly and the properties of the binder coated on the separator.

The lamination step (S400) according to an embodiment of the present invention is performed before the initial formation process. In the present invention, the formation process should be understood as a concept including an initial charge that is fully charged or partially charged with some capacity of a state of charge (SOC) in order to stabilize the structure of the electrode.

Through the initial charging step, lithium ions from the lithium transition metal oxide used as a positive electrode move to the carbon electrode used as a negative electrode. At this time, since lithium ions are highly reactive, they react with carbon negative electrodes to form compounds such as $Li_2CO_3$, LiO, and LiOH, and SEI films are formed on the surface of negative electrodes by these compounds. The SEI film is a non-conductor that is formed when the amount of ion migration in the battery increases, and when the SEI film is formed, lithium ion and other substances are prevented from reacting at the negative electrode when charging the battery later. In addition, the SEI film can function as an ion tunnel, and serves to pass only lithium ions. After the SEI film is formed, lithium ions do not react with the negative electrode or other substances, so the amount of lithium ions is reversibly maintained and charging and discharging of the lithium secondary battery is reversibly maintained to improve battery life. In addition, even when the SEI film is left at a high temperature or charging and discharging is repeatedly performed, a change in the thickness of the battery is less likely to occur.

In the case of performing the initial charging, a large amount of side reaction gases are generated, which may cause a problem that the SEI film is not uniformly formed according to the flow of the side reaction gas. In order to solve this, a process of pressing the secondary battery at the same time as the initial charging may be performed. The pressing may be performed using a jig or the like, but is not limited if it is a means capable of pressing the secondary battery. The pressurization may be applied to the battery cell at 100 kgf/cm$^2$ to 500 kgf/cm$^2$.

The volume of the first electrode and the second electrode is expanded by the formation process. Hence, in order to achieve the object of the present invention, it is preferable that the lamination step (S400) is performed prior to the first formation process or during the first formation process.

At this time, the temperature during the formation process may be 45° C. or less. When the temperature exceeds 45° C. during the first formation process, the binder contained in the coating material applied to the separator comes to have adhesive force, which can bond a basic unit body adjacent to a basic unit body. As such, since it is not necessary to perform the heating and pressing process before the first formation process, the manufacturing method of the present invention may be particularly useful when the temperature in the first formation process needs to be set to 45° C. or less.

After the lamination and formation process is performed as described above, one or more processes of an aging process, a degassing process, and a formation process may be further included.

Hereinafter, the present invention will be described in detail with reference to examples. However, the embodiments according to the present invention may be modified into various other forms, and the scope of the present invention should not be construed as being limited to the embodiments described below. The embodiments of the present invention are provided to more fully describe the present invention to those skilled in the art.

Preparation Example 1

Preparation of Positive Electrode

A positive electrode mixture slurry was prepared by adding 96.25% by weight of $LiCoO_2$ as a positive electrode active material, 1.5% by weight of carbon black as a conductive material, and 2.25% by weight of PVDF as a binder to N-methyl-2 pyrrolidone (NMP) as a solvent. The positive electrode mixture slurry was applied to a positive electrode plate, an aluminum (Al) thin film having a thickness of 12 μm, and dried to prepare a positive electrode, followed by roll press.

Preparation of Negative Electrode

A negative electrode mixture slurry was prepared by adding 96% by weight of carbon powder as negative electrode active material, 3% by weight of carbon black as a conductive material, and 1% by weight of polyvinylidene fluoride (PVdF) as a binder to N-methyl-2 pyrrolidone (NMP) as a solvent. The negative electrode mixture slurry was applied to a negative electrode plate, a copper (Cu) thin film having a thickness of 10 μm, and dried to prepare a negative electrode, followed by roll press.

Preparation of Basic Unit Body

A separator coated with a coating material containing a binder A is prepared on both sides of the polyolefin separator, and a basic unit body was prepared with a positive electrode/a separator/a negative electrode/a separator by using a laminator shown in FIG. 3.

The binder A is a mixture of PVdF-HFP copolymer with a molecular weight of 410-450 Kg/mol (a polymer material with a HFP content of 15 mol % or more and a Tm of 140 degrees or less compared to PVdF) and PVDF-CTFE copolymer with a molecular weight of 250 to 300 kg/mol and a Tm of 160° C. or higher.

Assembly Step

The three basic unit bodies were stacked to form a unit body stack portion, and the unit body stack portion was accommodated in a pouch exterior material of a CPP/aluminum/nylon laminate sheet. Ethyl methyl carbonate electrolyte containing $LiPF_6$ was injected and the pouch exterior material was heat-sealed to complete assembly of the secondary battery.

Preparation Example 2

In Preparation Example 1, assembly of the secondary battery was completed in the same manner as in Preparation Example 1, except that the type of the binder contained in the coating material applied to the separator was changed to binder B.

The binder B is a mixture of PVdF-HFP copolymer with a molecular weight of 380-400 Kg/mol (a polymer material with a HFP content of 8 mol % or less and a Tm of 150° C. or higher compared to PVdF) and PVDF-CTFE copolymer with a molecular weight of 250 to 300 kg/mol and a Tm of 160° C. or higher.

Preparation Example 3

The assembly of the secondary battery was completed in the same manner as in Preparation Example 1, except that the solvent of the electrolyte was changed to dimethyl carbonate in the assembly step of Preparation Example 1.

Comparative Example 1

After the assembled secondary battery of Preparation Example 1 was aged at room temperature for about 72 hours, the pouch with the electrode assembly was mounted on a pressurizing jig and pressurized at a pressure of 5 kgf/cm² and at a temperature of 25° C. for 11 minutes. Subsequently, the secondary battery was charged while being pressurized at a pressure of 5 kgf/cm² at room temperature, and then fully discharged.

Examples 1 to 5

After the assembled secondary battery of Preparation Example 1 was aged at room temperature for about 72 hours, the pouch with the electrode assembly was mounted on a pressurizing jig and pressurized at a pressure of 5 kgf/cm² and at respective temperatures of 45, 50° C., 55° C., 60° C. and 65° C. for 11 minutes. Subsequently, the secondary battery was charged while being pressurized at a pressure of 5 kgf/cm² at room temperature, and then fully discharged.

Comparative Example 2

After the assembled secondary battery of Preparation Example 1 was aged at room temperature for about 72 hours, the pouch with the electrode assembly was mounted on a pressurizing jig and pressurized at a pressure of 5 kgf/cm² and at a temperature of 70° C. for 11 minutes. Subsequently, the secondary battery was charged while being pressurized at a pressure of 5 kgf/cm² at room temperature, and then fully discharged.

Comparative Examples 3 to 4

After the assembled secondary battery of Preparation Example 2 was aged at room temperature for about 72 hours, the pouch with the electrode assembly was mounted on a pressurizing jig and pressurized at a pressure of 5 kgf/cm² and at respective temperatures of 55° C. and 60° C. for 11 minutes. Subsequently, the secondary battery was charged while being pressurized at a pressure of 5 kgf/cm² at room temperature, and then fully discharged.

Examples 6 to 8

After the assembled secondary battery of Preparation Example 2 was aged at room temperature for about 72 hours, the pouch with the electrode assembly was mounted on a pressurizing jig and pressurized at a pressure of 5 kgf/cm² and at respective temperatures of 65° C., 70° C. and 75° C. for 11 minutes. Subsequently, the secondary battery was charged while being pressurized at a pressure of 5 kgf/cm² at room temperature, and then fully discharged.

Example 9

After the assembled secondary battery of Preparation Example 3 was aged at room temperature for about 72 hours, the pouch with the electrode assembly was mounted on a pressurizing jig and pressurized at a pressure of 5 kgf/cm² and at a temperature of 55° C. for 11 minutes. Subsequently, the secondary battery was charged while being pressurized at a pressure of 5 kgf/cm² at room temperature, and then fully discharged.

Comparative Example 5

After the assembled secondary battery of Preparation Example 1 was aged at room temperature for about 72 hours, the secondary battery was charged while being pressurized at a pressure of 1 kgf/cm² at room temperature, and then fully discharged.

Comparative Example 6

After the assembled secondary battery of Preparation Example 1 was aged at room temperature for about 72 hours, the secondary battery was charged while being pressurized at a pressure of 10 kgf/cm² at room temperature, and then fully discharged.

Experimental Example 1—Measurement of Adhesive Force after Charging

For each secondary battery of Examples 1 to 8 and Comparative Examples 1 to 4, the pouch was opened to take out the electrode assembly. Thereafter, a sample for measuring adhesive force was taken from the electrode assembly and immediately adhered to a slide glass. The peel-off was performed at a 90-degree angle and a speed of 10 mm/min to measure the adhesive force and the results are shown in Table 1.

TABLE 1

| Division | Binder | Temperature during lamination (° C.) | Adhesive force (gf/20 mm) |
|---|---|---|---|
| Comparative Example 1 | A | 25 | 0 |
| Example 1 | | 45 | 25 |
| Example 2 | | 50 | 35 |
| Example 3 | | 55 | 41 |
| Example 4 | | 60 | 20.5 |
| Example 5 | | 65 | 9 |
| Comparative Example 2 | | 70 | 1 |
| Comparative Example 3 | B | 55 | 2 |
| Comparative Example 4 | | 60 | 2 |
| Example 6 | | 65 | 4 |
| Example 7 | | 70 | 25 |
| Example 8 | | 75 | 3.8 |

As shown in Table 1, the temperature at which the adhesive force is maximized differs according to the type of the binder included in the coating material applied to the separator. The binder of Preparation Example 1 showed the maximum adhesive force when laminated at 55° C., and the binder of Preparation Example 2 showed the maximum adhesive force at 70° C. Therefore, in the lamination process of the present invention, the temperature condition is preferably selected in consideration of the adhesive performance according to the temperature of the binder.

Experimental Example 2—Measurement of Wet Adhesive Force According to Electrolyte 20 secondary batteries prepared as in Example 3 and Example 9 were prepared, respectively, and the pouch was opened to take out the electrode assembly in the pouch. Thereafter, a sample for measuring adhesive force was taken and immediately adhered to a slide glass. The peel-off was performed at a speed of 10 mm/min at an angle of 90 degrees to the interface between the positive electrode and the separator in the basic unit body to measure the adhesive force (this is called adhesive force of lamination surface). The adhesive force measurement was conducted in the same manner for the interface between the basic unit body and the basic unit body (this is referred to as an adhesive force of a stack surface). When the peel-off is performed, a peel-off test was performed by holding the electrode and the separator together to prevent damage to the adhesive force of the sample, and the results of the adhesive force measurement are shown in Table 2 below.

TABLE 2

| | | Adhesive force (gf/20 mm) | |
|---|---|---|---|
| | Solvent | Lamination surface | Stack surface |
| Example 3 | Ethyl methyl carbonate | 30~41 | 38~50 |
| Example 9 | Dimethyl carbonate | 46~56 | 50~60 |

In the electrode assembly of the present invention, after charging, an adhesive force between a basic unit body and an adjacent basic unit body (stack surface) is formed, and the magnitude of the adhesive force is similar to or greater than the adhesive force between the electrode in the basic unit body and the separator (laminate surface). As described above, in the electrode assembly of the present invention, an adhesive force is formed between a basic unit body and an adjacent basic unit body through a heating and pressing process prior to the formation process, and thus the positive electrode and the negative electrode constituting the electrode assembly become continuous. As such, even if there is electrode expansion due to charging, stress of electrode expansion is alleviated, and the directionality of expansion disappears, so that the bending phenomenon of the electrode assembly can be prevented.

Experimental Example 3—Checking of Whether Bended

For each secondary battery of Examples 2 to 4 and Comparative Examples 5 and 6, the pouch was opened to take out the electrode assembly. After applying a force of 30 kgf to the electrode assembly for 2 seconds, the thickness of the electrode assembly was measured (d1). Then, after applying a force of 90 kgf for 2 seconds, the thickness of the electrode assembly was measured (d2). The difference between d1 and d2 was measured and the results are shown in Table 3. The larger the difference in thickness means that the bending phenomenon is intensified, and when the thickness difference is 0, it means that bending has not occurred.

TABLE 3

| | Lamination conditions | | |
|---|---|---|---|
| Division | Temperature (° C.) | Pressure (kgf/cm$^2$) | Thickness difference (μm) |
| Example 2 | 50 | 5 | 100 |
| Example 3 | 55 | 5 | 0 |
| Example 4 | 60 | 5 | 0 |
| Comparative Example 5 | 25 | 1 | 200 |
| Comparative Example 6 | 25 | 10 | 320 |

Referring to Table 3, each electrode assembly according to Examples 2 to 4 of the present invention has a thickness difference of 100 μm or less, and a bending phenomenon has not occurred or even if the bending phenomenon has occurred, it is difficult to visually check the bending by using naked eyes. On the other hand, before the formation process, each electrode assembly of Comparative Examples 5 and 6, in which only pressurization was performed without heating, had a difference in thickness of 200 μm or more, and it was shown that the bending phenomenon was intensified compared to the above examples.

Therefore, in order to prevent the bending phenomenon of the electrode assembly, it is desirable to form an adhesive force at an interface (stack surface) between a basic unit body and a basic unit body by performing a lamination process of heating and pressing the electrode assembly at an appropriate temperature before the formation process.

The invention claimed is:

1. An electrode assembly comprising a unit body stack portion which is generated by stacking at least two basic unit bodies, each basic unit body having at least a four-layer structure in which a first electrode, a first separator, a second electrode and a second separator are sequentially stacked and adhered prior to the at least two basic unit bodies being stacked,
    wherein coating materials having adhesive force are applied to respective surfaces of the first and second separators,
    wherein one basic unit body of the at least two basic bodies is adhered to an adjacent basic unit body of the at least two basic bodies in the unit body stack portion, and
    wherein adhesive force between the one basic unit body and the adjacent basic unit body is greater than adhesive force between the first electrode and the first separator in each basic unit body.

2. The electrode assembly of claim 1, wherein the second separator is coated with the coating material on one side facing the second electrode and on an opposite side thereof, and the at least two basic unit bodies are adhered to each other by the coating material of the second separator.

3. The electrode assembly of claim 1, wherein a difference between a thickness of the electrode assembly measured for 2 seconds under a pressure of 30 kgf and a thickness of the electrode assembly measured for 2 seconds under a pressure of 90 kgf is 100 μm or less.

4. The electrode assembly of claim 1, wherein the first electrode is a positive electrode, and
    wherein the second electrode is a negative electrode.

5. The electrode assembly of claim 1, wherein each basic unit body is formed by repeatedly stacking the four-layer structure.

6. A method for manufacturing a secondary battery including the electrode assembly of claim 1, the method comprising steps of:
preparing each basic unit body having the four-layer structure in which the first electrode, the first separator, the second electrode and the second separator are sequentially stacked (S100);
preparing the unit body stack portion by repeatedly stacking the basic unit bodies (S200);
accommodating the electrode assembly including the unit body stack portion in a battery case, then injecting electrolyte and sealing the battery case (S300); and
making the second separator of the one basic unit body be adhered to the first electrode of the adjacent basic unit body in the unit body stack portion by applying heat and pressure (S400).

7. The method of claim 6, wherein the coating material having the adhesive force includes a binder.

8. The method of claim 7, wherein a temperature of the applied heat of step S400 is 45° C. to 85° C.

9. The method of claim 7, wherein a temperature of the applied heat of step S400 is 45° C. to 70° C.

10. The method of claim 6, wherein a pressure of the applied pressure of step S400 is 1 to 10 kgf/cd, and heating and pressurizing time is 2 to 20 minutes.

11. The method of claim 6, wherein, after the step S400, a primary formation process is performed.

12. The method of claim 11, wherein a temperature during the primary formation process is 45° C. or less.

13. The method of claim 6, wherein a solvent of the electrolyte is ethyl methyl carbonate or dimethyl carbonate.

14. A secondary battery including an electrode assembly according to claim 1.

* * * * *